US008709535B2

(12) United States Patent
Knight (10) Patent No.: US 8,709,535 B2
(45) Date of Patent: Apr. 29, 2014

(54) METHOD OF ENHANCING CORROSION RESISTANCE OF HOLLOW VESSELS

(75) Inventor: Timothy E. Knight, Slinger, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 2922 days.

(21) Appl. No.: 11/241,860

(22) Filed: Sep. 30, 2005

(65) Prior Publication Data

US 2007/0075087 A1 Apr. 5, 2007

(51) Int. Cl.
*B62J 35/00* (2006.01)
*B05D 1/18* (2006.01)

(52) U.S. Cl.
USPC .......... 427/230; 427/430.1; 427/235; 220/562

(58) Field of Classification Search
USPC .......................... 220/562; 427/230, 235, 430.1
See application file for complete search history.

(56) References Cited

U.S. PATENT DOCUMENTS

| | | | | |
|---|---|---|---|---|
| 2,186,285 | A * | 1/1940 | Eickmeyer | 72/47 |
| 4,201,664 | A * | 5/1980 | Hekal | 508/111 |
| 4,772,374 | A * | 9/1988 | Urquhart et al. | 204/625 |
| 5,393,416 | A * | 2/1995 | Kozak et al. | 210/96.1 |
| 5,542,706 | A * | 8/1996 | Kubly | 280/833 |
| 6,211,283 | B1 * | 4/2001 | Honda et al. | 524/501 |
| 7,388,044 | B2 * | 6/2008 | McGee et al. | 523/402 |
| 2003/0068498 | A1 * | 4/2003 | Weller et al. | 428/416 |
| 2003/0143405 | A1 * | 7/2003 | Bammel | 428/413 |
| 2003/0183626 | A1 * | 10/2003 | Tomimura et al. | 220/4.14 |
| 2003/0192624 | A1 * | 10/2003 | Siebert | 148/251 |
| 2003/0212181 | A1 * | 11/2003 | Honda et al. | 524/438 |
| 2004/0043155 | A1 * | 3/2004 | McGee et al. | 427/385.5 |
| 2004/0134892 | A1 * | 7/2004 | Kido et al. | 219/121.64 |
| 2004/0185233 | A1 * | 9/2004 | Sawatsky | 428/195.1 |
| 2004/0206266 | A1 * | 10/2004 | Maze et al. | 106/1.17 |
| 2004/0265502 | A1 * | 12/2004 | Williams | 427/443.1 |
| 2005/0025665 | A1 * | 2/2005 | Raniwala | 422/28 |
| 2006/0208226 | A1 * | 9/2006 | Maze et al. | 252/387 |

OTHER PUBLICATIONS

A Guide to Corrosion Protection, prepared by Light Truck Frame Project Team, Auto Steel Partnership, First Edition, published Dec. 1999.

* cited by examiner

*Primary Examiner* — Mickey Yu
*Assistant Examiner* — Niki Eloshway
(74) *Attorney, Agent, or Firm* — Michael Best & Friedrich LLP (57) ABSTRACT

A method of enhancing corrosion resistance of a hollow vessel. The method includes providing a hollow vessel including a wall defining a cavity, providing a coating tank filled with a liquid coating having charged coating elements, submerging the hollow vessel into the liquid coating, allowing the liquid coating to pass into the cavity through at least one aperture of the wall, coating the exterior surface of the wall with a portion of the coating elements, coating the interior surface of the wall with an additional portion of the coating elements, removing the hollow vessel from the coating tank, draining the liquid coating from the cavity, heating the hollow vessel in an oven, and curing the portion of the coating elements on the exterior surface and curing the additional portion of the coating elements on the interior surface.

13 Claims, 6 Drawing Sheets

METHOD OF ENHANCING CORROSION RESISTANCE OF HOLLOW VESSELS

BACKGROUND

The present invention relates to corrosion protection for hollow vessels, and more particularly to corrosion, chemical, and fuel resistance in hollow vessels, such as fuel tanks, used with motorcycles.

A motorcycle includes a frame and an internal-combustion engine coupled to the frame and operable to propel the motorcycle. The internal-combustion engine runs on fuel supplied from a fuel tank that is also coupled to the frame. The fuel tank is a hollow vessel that includes a wall defining a cavity for storing fuel. The wall includes an interior surface exposed to the fuel and an exterior surface exposed to the environment. The fuel tank is commonly fabricated by welding a series of formed patterns of sheet metal. The interior and exterior surfaces usually include enhanced surface treatments such that the interior surface resists the corrosive effects caused by the fuel and the exterior surface resists the corrosive effects of the environment to maintain an aesthetically pleasing appearance.

The enhancement of the interior and exterior surfaces of the fuel tank is typically a two-step process. First, the corrosion resistance of the interior of the tank is addressed. There are many different ways to accomplish the desired corrosion resistance properties. One way is to fabricate the entire tank with stainless steel or nickel plated steel. Although these materials may provide acceptable corrosion resistance, they are significantly more expensive than more commonly-used materials, such as low-carbon steel. A more common way to enhance the corrosion resistance of the interior surface is to use a low-cost, low-carbon steel and to powder coat the interior surface with an epoxy material.

The powder coat process includes first cleaning the cavity, and then applying a dry powder to the clean interior surface. The powder is applied using an electrostatic process where the tank is grounded and the cavity is sprayed with the powder, which consists of charged, non-conducting powder particles. The charged particles are attracted to the interior surface and cling to it. The tank is heated in an oven to fuse the particles into a smooth continuous film. The fused epoxy coating improves the corrosion resistance of the interior surface of the tank.

After the interior surface of the tank is coated, the corrosion resistance of the exterior surface is addressed. One common way to improve the properties of the exterior surface of the tank is through an electrodeposition or electrocoat (E-coat) process. However, before beginning the E-coat process, the tank must be prepared by the labor intensive process of isolating the interior of the tank to protect the interior of the tank. This is done by blocking all of the holes that allow access to the cavity, for example, by using tooling, plugs, and seals to block the tank's fuel fill opening, vent holes, and fuel line ports. Despite this blocking operation, the fuel tanks are susceptible to possible leaking during the subsequent processes, which may cause defects in the cavity and increase scrap costs.

Once the cavity is isolated, the exterior surface of the tank is washed by immersing the tank into a bath or by spraying the exterior surface with cleansers to remove soils, oil, grease, lubricants, and rust. After the exterior surface is cleaned, a conversion coating is applied to the surface to enhance the adhesion of the subsequent E-coat. The conversion coating is typically a phosphate coating (e.g., iron, zinc, or manganese) and is applied to the tank by immersing the clean tank into a hot processing solution for a period of time dependent upon the bath chemistry and material being used.

After the pretreatment with the phosphate conversion coating, the E-coat process is used. E-coat deposition is a process in which positively charged particles are deposited out of a water suspension to coat a conductive part. First the tank is grounded or charged and submerged into a coating tank to begin the cathodic electromechanical process. In this process, the electrically-charged coating binder, pigment, and additives migrate through the water under the influence of an electric field onto the exterior surface. The electrical charge seeks out the path of least resistance and coats the portions of the exterior surface of the tank. As the process continues, the charged particles resume their search for uncoated portions of the tank and begin coating areas that are not as easily reached. The ability to coat these hard-to-reach areas of the tank is known as the coating's "throw-power".

Once on the part, the charged materials give up their charge due to neutralization by electrochemically generated $OH^-$ ions. Upon giving up their charge, the coating materials drop out of the water suspension and coalesce as a coating on the exterior surface. The fuel tank is then removed from the coating tank, rinsed, and cured in an oven, after which, the plugs and seals are removed from the openings in the fuel tank.

In cases where the plugs and seals fail to adequately isolate the cavity, the cavity becomes at least partially filled with the liquid coating of the E-coat process when the fuel tank is submerged in the coating tank. The presence of the liquid coating in the cavity during the curing process damages the integrity of the powder coat on the interior surfaces. Therefore, the "leakers" are typically scrapped or stripped and completely recoated.

SUMMARY

The present invention provides a method of enhancing corrosion resistance of a hollow vessel. The method includes providing a hollow vessel including a wall defining a cavity. The wall includes interior and exterior surfaces and at least one aperture providing access to the cavity. The method further includes providing a coating tank filled with a liquid coating having charged coating elements, submerging the hollow vessel into the liquid coating, allowing the liquid coating to pass through the at least one aperture into the cavity, coating the exterior surface with a portion of the coating elements, coating the interior surface with an additional portion of the coating elements, removing the hollow vessel from the coating tank, draining the liquid coating from the cavity, heating the hollow vessel in an oven, and curing the portion of the coating elements on the exterior surface and curing the additional portion of the coating elements on the interior surface.

The present invention also provides a novel hollow vessel. The hollow vessel includes a wall defining a cavity, and the wall includes interior and exterior surfaces and at least one aperture providing access to the cavity. The interior and exterior surfaces are coated by the process of providing a coating tank filled with a liquid coating having charged coating elements, submerging the hollow vessel into the liquid coating, allowing the liquid coating to pass through the at least one aperture into the cavity, coating the exterior surface with a portion of the coating elements, coating the interior surface with an additional portion of the coating elements, removing the hollow vessel from the coating tank, draining the liquid coating from the cavity, heating the hollow vessel in an oven, and curing the portion of the coating elements onto the exterior surface and curing the additional portion of the coating elements onto the interior surface.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
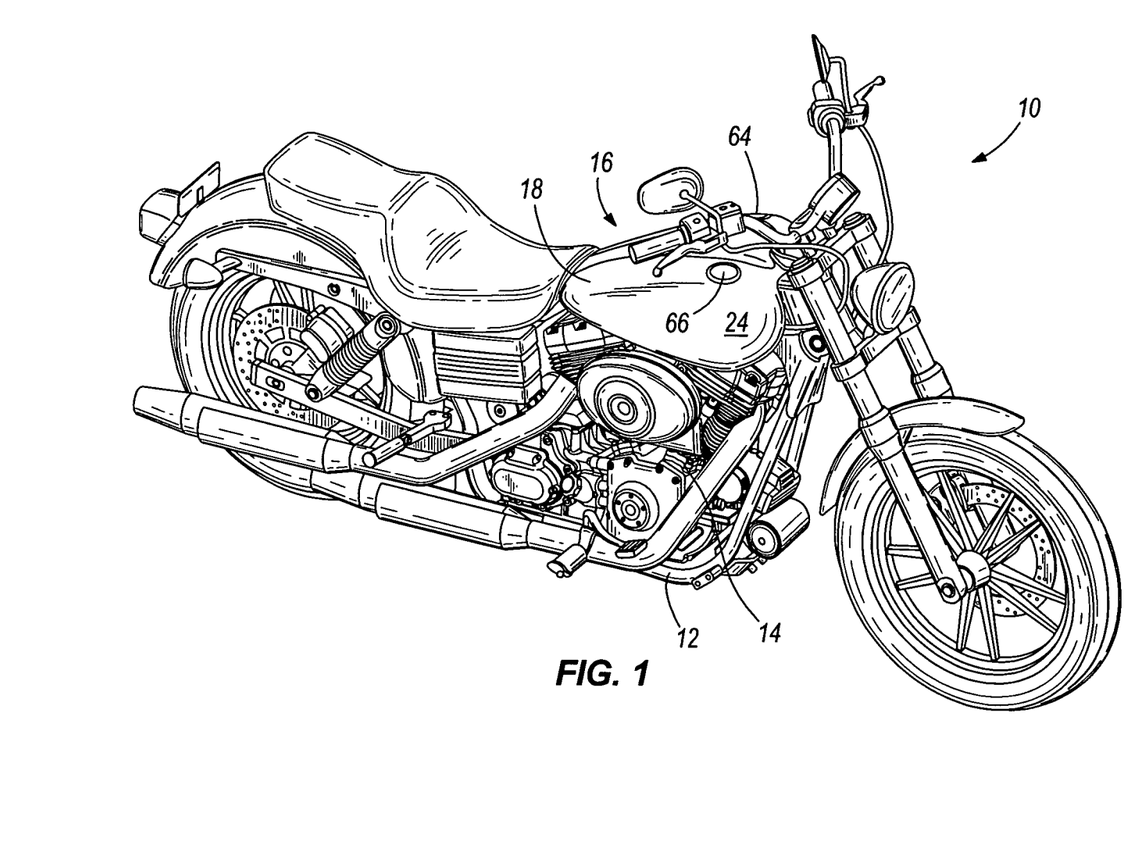
FIG. 1 is a perspective view of a motorcycle having a fuel tank embodying the present invention.

The motorcycle 10 illustrated in FIG. 1 includes a frame 12 and an internal-combustion engine 14 coupled to the frame 12 and adapted to propel the motorcycle 10. The internal-combustion engine 14 runs on fuel supplied from a fuel tank 16 that is also coupled to the frame 12.

Figure 2:
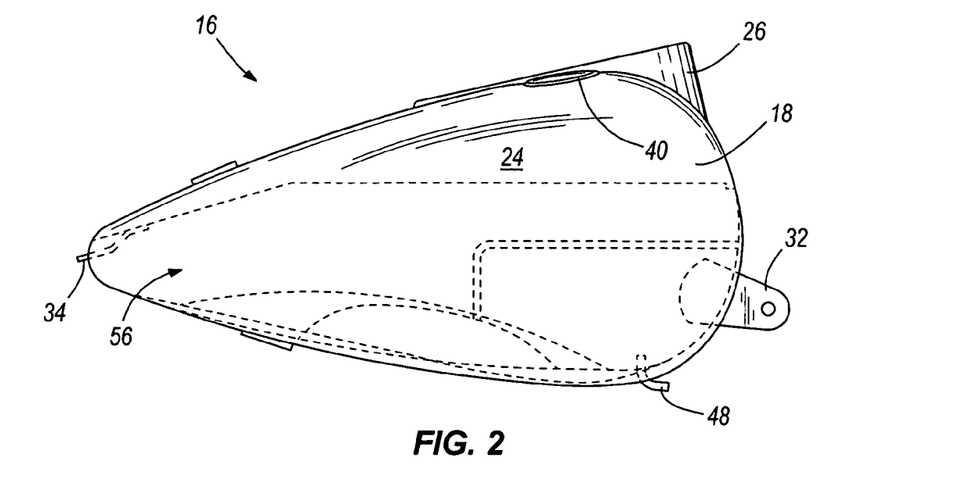
FIG. 2 is a side view of the fuel tank of FIG. 1, illustrating the fuel tank in the upright orientation.
Figure 3:
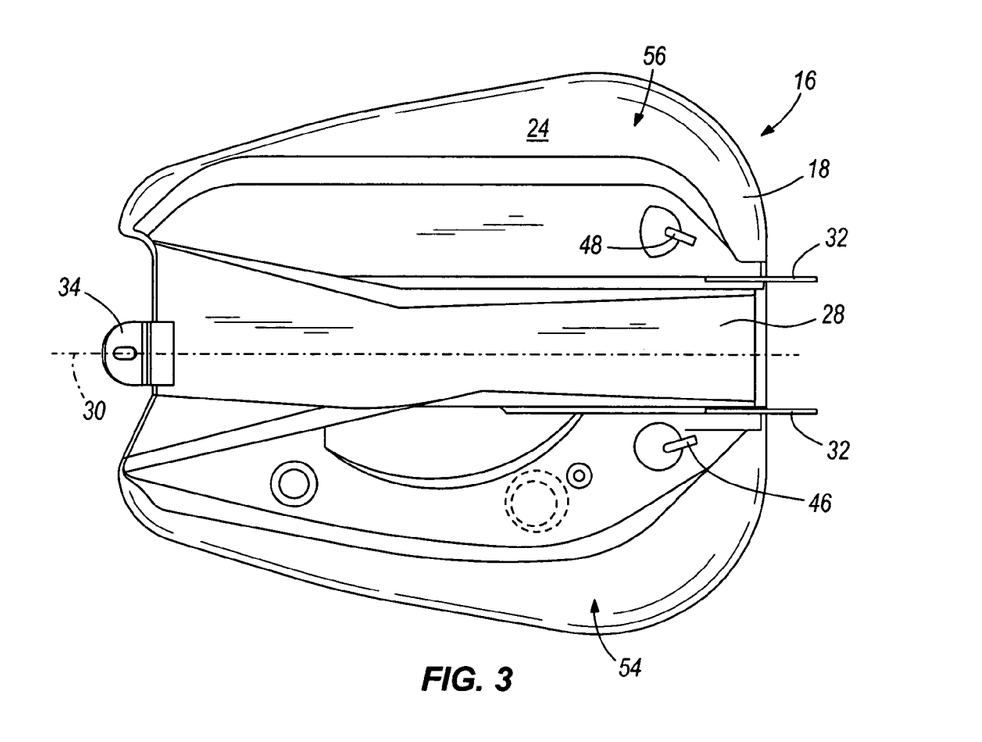
FIG. 3 is a bottom view of the fuel tank of FIG. 1.
Figure 4:
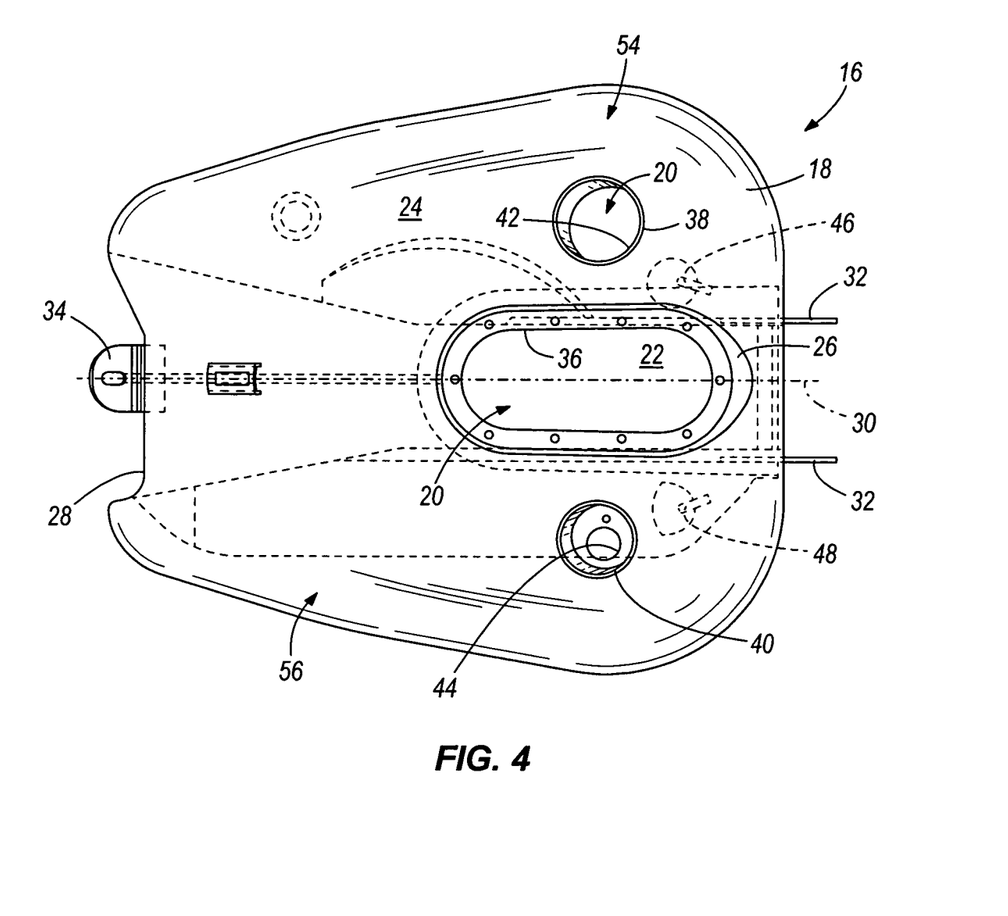
FIG. 4 is a top view of the fuel tank of FIG. 1.

With reference to FIGS. 2-4, the fuel tank 16 is a hollow vessel that includes a wall 18 that defines a cavity 20 for storing fuel. Although the hollow vessel is illustrated as a fuel tank 16, the hollow vessel could also be another component used on a motorcycle such as an oil tank, a master cylinder housing, a crankcase, a transmission case, or other vessels generally defining a cavity. The wall 18 includes an interior surface 22 and an exterior surface 24 exposed to the environment. The fuel tank 16 includes a canopy 26 on the top side of the fuel tank 16, and a tunnel 28 that extends along the longitudinal axis 30 of the fuel tank 16 on the bottom side of the fuel tank 16. The fuel tank 16 includes forward and rear mounting brackets 32, 34 that are used to attach the fuel tank 16 to the frame 12 such that the backbone (not shown) of the frame 12 is received within the tunnel 28 on the bottom of the fuel tank 16. The fuel tank 16 is oriented in the upright orientation (illustrated in FIG. 2) when the fuel tank 16 is connected to the motorcycle frame 12.

The canopy 26 is positioned near the uppermost portion of the fuel tank 16 and includes an aperture 36 providing access to the cavity 20. The fuel tank 16 also includes a gauge cup 38 and a filler neck 40 on the top surface. The gauge cup 38 provides a mounting location for a fuel gauge 64 (FIG. 1) and includes an aperture 42 allowing access to the cavity 20 such that a portion of the fuel gauge 64 can be passed into the cavity 20 to be in contact with fuel contained within the fuel tank 16. The filler neck 40 provides a mounting location for a fuel cap 66 (FIG. 1) and includes an aperture 44 that is adapted to allow a fuel pump nozzle to access the cavity 20 to fill the fuel tank 16 with fuel. The fuel tank 16 also includes first and second fittings 46, 48 positioned near the lowermost portion of the fuel tank 16. The fittings 46, 48 include apertures (not shown) providing access to the cavity. The fittings 46, 48 can provide attachment locations for vent or fuel lines. The canopy aperture 36 is capsule-shaped and is substantially larger than the fuel gauge aperture 42 and the filler neck aperture 44. The canopy aperture 36 is over twice as large as the fuel gauge aperture 42 and four times as large as the filler neck aperture 44. In some configurations, the canopy aperture 36 measures between 2 and 4 inches across the minor dimension and between 6 and 10 inches across the major dimension.

The illustrated fuel tank 16 is fabricated by welding formed left and right shell patterns 54, 56 of sheet metal, such as low carbon steel or other ferrous metals. In other embodiments, the hollow vessel could be molded from a conductive composite material. The interior and exterior surfaces 22, 24 include enhanced surface treatments such that the interior surface 22 resists the corrosive effects caused by the fuel and the exterior surface 24 resists the corrosive effects of the environment to maintain an aesthetically pleasing appearance.

The enhancement of the interior and exterior surfaces 22, 24 of the fuel tank 16 occurs during a single process step. More specifically, the interior and exterior surfaces 22, 24 of the fuel tank 16 are both treated together by an electrodeposition or electrocoat (E-Coat) coating process. Initially the fuel tank 16 is washed by immersing the fuel tank 16 into a bath or by spraying the interior and exterior surfaces 22, 24 with cleansers to remove soils, oil, grease, lubricants, and rust. After the fuel tank 16 is cleaned, a conversion coating is applied to the interior and exterior surfaces 22, 24 to enhance the adhesion of the subsequent E-coat. The conversion coating is typically a phosphate coating (e.g., iron, zinc, or manganese) and is applied to the fuel tank 16 by immersing the clean fuel tank 16 into a hot processing solution for a period of time dependent upon the bath chemistry and material being used.

Figure 5:
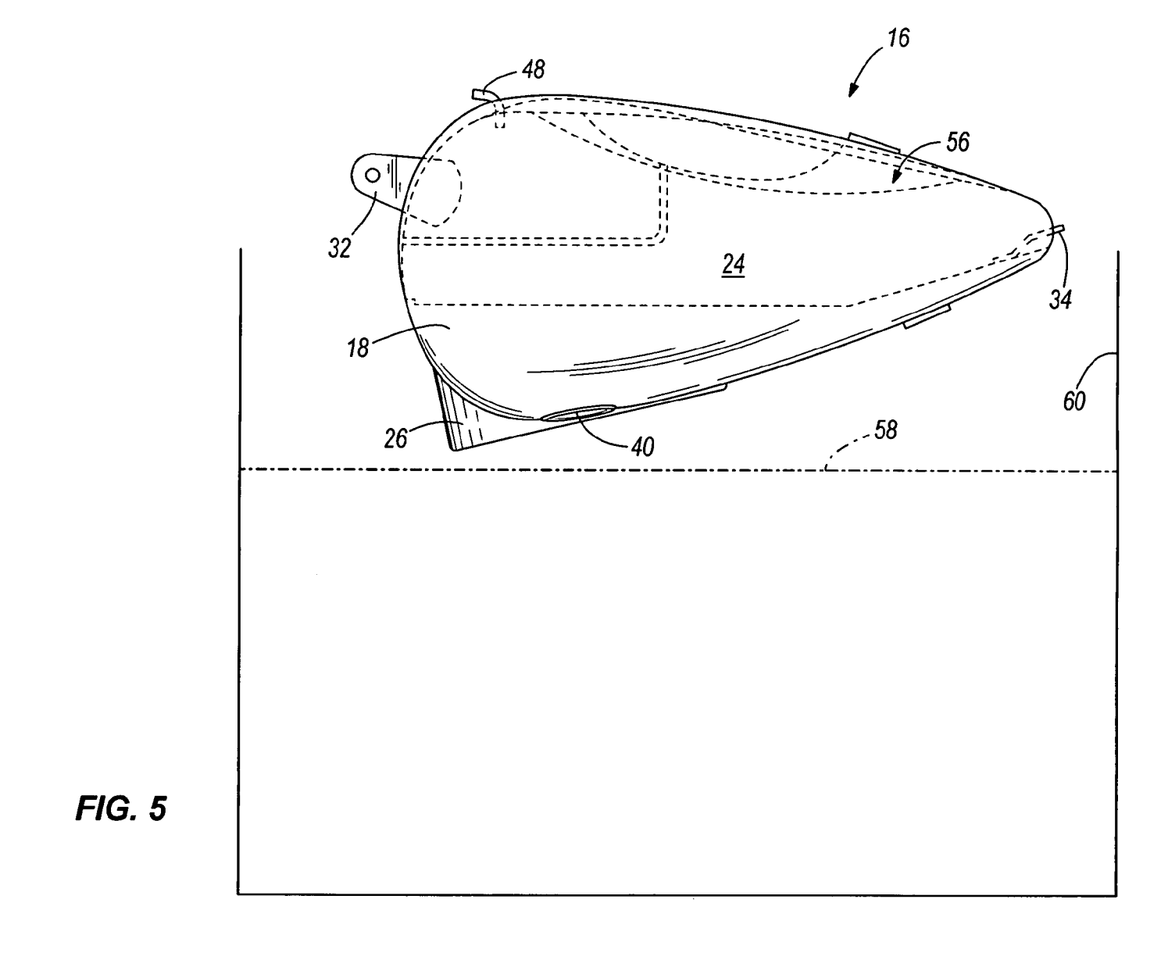
FIG. 5 is a side view of the fuel tank of FIG. 1, illustrating the fuel tank in the upside-down orientation above a coating tank containing a liquid coating.
Figure 6:
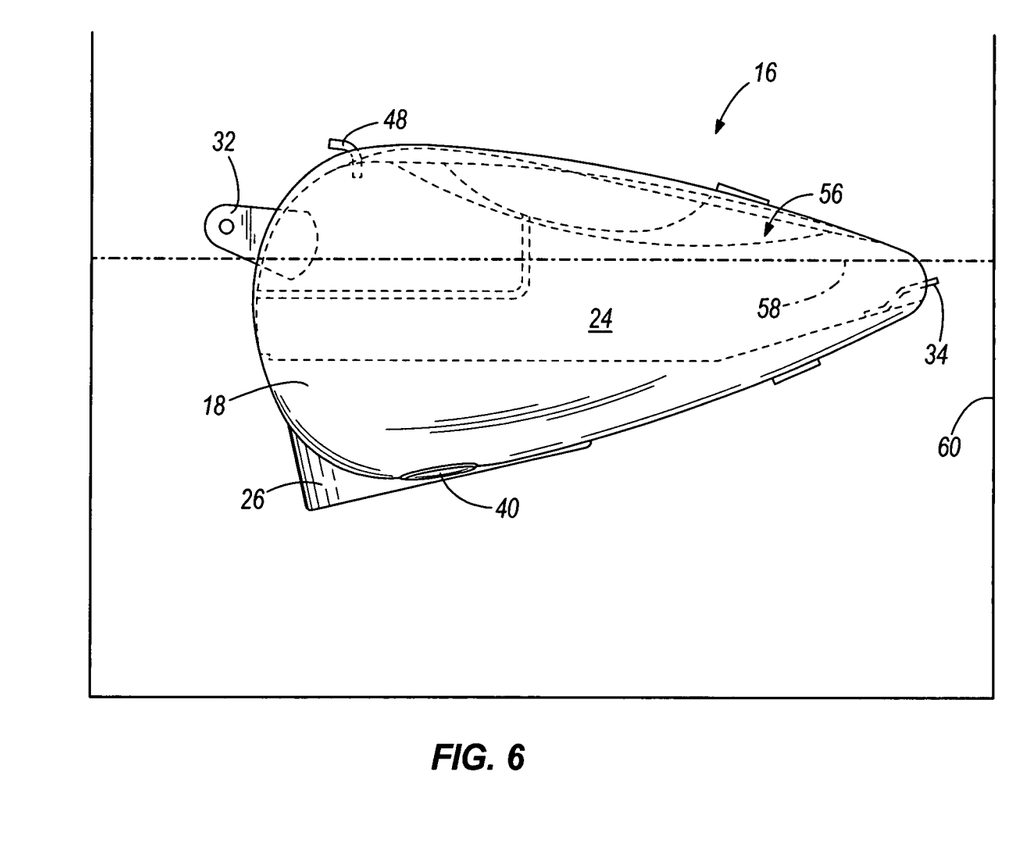
FIG. 6 is a view similar to FIG. 5, illustrating the fuel tank partially submerged into the liquid coating.
Figure 7:
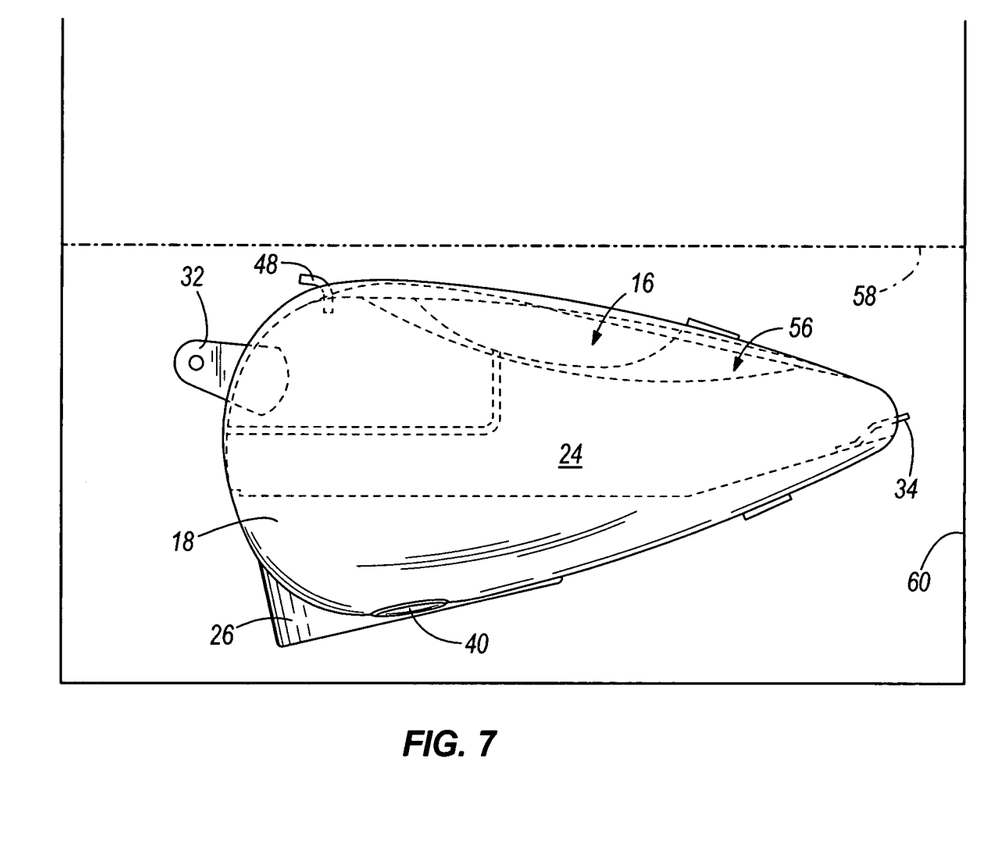
FIG. 7 is a view similar to FIG. 6, illustrating the fuel tank fully submerged into the liquid coating.

After the pretreatment with the phosphate conversion coating, the E-coat process is used where positively charged particles are deposited out of a water suspension to coat a grounded or negatively charged fuel tank 16. As shown in FIGS. 5-7, the fuel tank 16 is mounted to a fixture (not shown) such that the fuel tank 16 is in an upside-down orientation. The upside down orientation allows the fittings 46, 48 to serve as vents allowing a liquid coating 58 to easily enter into the cavity 20 through the canopy aperture 36 as the fuel tank 16 is lowered into the liquid coating 58 contained within a coating tank 60. This fuel tank 16 configuration allows quick and complete submersion into the liquid coating 58 and provides for the displacement of air with the liquid coating 58.

After the fuel tank 16 is submerged within the liquid coating 58, the cathodic electromechanical process begins. In other embodiments, an anionic process can be used instead. In the cathodic process, the electrically-charged coating 58 (including binder, pigment, and additives) migrates through the water under the influence of an electric field onto the interior and exterior surfaces 22, 24. The electrical charge initially seeks out the path of least resistance and coats the exterior surface 24 of the fuel tank 16. As the process continues, the charged particles resume their search for uncoated portions of the fuel tank 16 and begin coating areas that are not as easily reached, such as the interior surface 22 within the cavity 20 of the fuel tank 16. Due to the configuration of the fuel tank 16 including the enlarged aperture 36 of the canopy 26 and the positions of the canopy aperture 36 and the fitting apertures on the extreme upper and lower points on the fuel tank 16, the coating has sufficient throw power to substantially evenly coat both the interior and exterior surfaces 22, 24 of the fuel tank 16.

Once on the interior and exterior surfaces 22, 24, the charged materials give up their charge due to neutralization by electrochemically generated OH⁻ ions. Upon giving up their charge, the coating materials drop out of the water suspension and coalesce as a coating on the interior and exterior surfaces 22, 24. After a designated period of time, the fuel tank 16 is raised from the coating tank 60 and the liquid coating 58 drains from the fuel tank 16 through the canopy aperture 36. The configuration of the fuel tank 16 allows the liquid coating 58 to quickly and completely drain from the cavity 20. The liquid coating 58 is then rinsed from the interior and exterior surfaces 22, 24 and the fuel tank 16 is placed in an oven to cure the coating materials.

In the illustrated embodiment, only a single fuel tank 16 is attached to a fixture. However, in other embodiments, fixtures can be manufactured to hold multiple fuel tanks 16 such that more than one fuel tank 16 can be coated at the same time. For example, 2, 3, 4, or even more fuel tanks 16 could be processed together on a single fixture. The fixture can also be wired to provide the necessary electrical charge to the fuel tanks 16. In addition, the fixtures can be connected to a conveyor such that a significant portion of the E-coat process can be automated.

FIGS. 5-7 illustrate the fuel tank 16 being dipped into the liquid coating 58 in the coating tank 60 along a substantially vertical line of motion. It is also understood that the fuel tank 16 can also be submerged into the liquid coating 58 through rotation, horizontal translation, vertical translation, or any combination of these motions. More complex dipping motions may be necessary for more complex cavity configurations where a simple straight up and down dipping motion may leave air trapped in an undercut or non-vented portion of the fuel tank 16 or may provide inadequate drainage. In these instances, rotation, pivoting, spinning, or other complex motion may be used to ensure complete coverage of the coating solution in the cavity 20 and to ensure complete drainage of the coating solution from the cavity 20.

An alternative coating process called autodeposition can also be used in place of the E-coat to coat both the interior and exterior surfaces 22, 24 of the fuel tank 16. Autodeposition does not require electrical charges to be applied to the fuel tank 20 or the coating tank 60. Autodeposition is a waterborne process that depends on chemical reactions to achieve deposition. The composition of an autodeposition bath includes a mildly acidic latex emulsion polymer, de-ionized water and other ingredients. The chemical phenomenon consists of the mildly acidic bath attacking the steel parts being immersed and causing an immediate surface reaction that releases iron ions. The ions react with the latex in solution causing a deposition on the surface of the interior and exterior surfaces 22, 24 of the steel parts. The newly deposited organic film is adherent yet quite porous. Thus, the chemical activators can rapidly diffuse to reach the internal and external surfaces 22, 24 of the metal, allowing continued coating formation.

Thus, embodiments of the present invention can, among other things, eliminate powder epoxy material costs, associated tooling and operational costs, eliminate the costs of Ni-clad and stainless steel components, eliminate plugging of the tanks including the tooling, plugs, seals, and associated labor, and eliminate E-coat "leakers" and its associated scrap costs. Various features and advantages of the invention are set forth in the following claims.

What is claimed is:

1. A method of enhancing corrosion resistance of a hollow vessel, the method comprising:
    providing a hollow vessel including a wall defining a cavity for storing a fluid with the vessel in an upright orientation, the wall including interior and exterior surfaces and a plurality of apertures providing access to the cavity;
    providing a coating tank filled with a liquid coating having charged coating elements;
    mounting the hollow vessel to a fixture in an upside-down orientation;
    submerging the hollow vessel into the liquid coating;
    allowing the liquid coating to pass into the cavity through at least a first one of the plurality of apertures, the first one of the plurality of apertures being positioned at the top of the hollow vessel when in the upright orientation;
    venting displaced air from the cavity through at least a second one of the plurality of apertures, the second one of the plurality of apertures being positioned at the bottom of the hollow vessel when in the upright orientation;
    coating the exterior surface with a portion of the coating elements;
    coating the interior surface with an additional portion of the coating elements;
    removing the hollow vessel from the coating tank;
    draining the liquid coating from the cavity;
    heating the hollow vessel in an oven; and
    curing the portion of the coating elements on the exterior surface and curing the additional portion of the coating elements on the interior surface.

2. The method of claim 1, wherein providing a coating tank includes providing a coating tank filled with an electrodeposition coating.

3. The method of claim 2, wherein providing a coating tank filled with an electrodeposition coating includes providing a coating tank filled with an epoxy electrodeposition coating.

4. The method of claim 3, further comprising submerging a counter electrode within the electrodeposition coating in the coating tank.

5. The method of claim 4, further comprising applying a negative charge to the hollow vessel and wherein providing a coating tank includes providing a coating tank filled with an electrodeposition coating having positively charged coating elements.

6. The method of claim 1, wherein providing a coating tank includes providing a coating tank filled with an autodeposition coating.

7. The method of claim 1, wherein providing a hollow vessel includes providing a fuel tank.

8. The method of claim 7, wherein the fuel tank includes a canopy positioned on the top of the fuel tank when in the upright orientation, and wherein the first one of the plurality of apertures is provided in the canopy such that the step of allowing the liquid coating to pass into the cavity includes allowing the liquid coating to pass into the cavity through the canopy.

9. The method of claim 8, wherein the fuel tank includes a fitting positioned on the bottom of the fuel tank when in the upright orientation, and wherein the second one of the plurality of apertures is provided in the fitting such that the step of venting displaced air from the cavity includes venting displaced air through the fitting.

10. The method of claim 8, wherein draining the liquid coating from the cavity includes draining the liquid coating through at least the first one of the plurality of apertures, which is provided in the canopy.

11. The method of claim 1, wherein the hollow vessel is completely submerged into the liquid coating while in the upside-down orientation.

12. The method of claim 11, wherein the hollow vessel is held in the upside-down orientation throughout the steps of coating the interior and exterior surfaces.

13. The method of claim 12, wherein the hollow vessel is additionally held in the upside-down orientation throughout the step of removing the hollow vessel from the coating tank, such that the coating of the interior and exterior surfaces is completed with a simple straight up and down dipping motion.

* * * * *